(12) United States Patent
Doan et al.

(10) Patent No.: US 9,715,282 B2
(45) Date of Patent: Jul. 25, 2017

(54) CLOSING, STARTING, AND RESTARTING APPLICATIONS

(71) Applicant: Microsoft Corporation, Redmond, WA (US)

(72) Inventors: Christopher Doan, Issaquah, WA (US); Chaitanya Sareen, Seattle, WA (US); Matthew Worley, Bellevue, WA (US); Michael Krause, Woodinville, WA (US); Miron Vranjes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 13/853,964

(22) Filed: Mar. 29, 2013

(65) Prior Publication Data
US 2014/0298272 A1 Oct. 2, 2014

(51) Int. Cl.
*G06F 3/01* (2006.01)
*G06F 3/0488* (2013.01)

(52) U.S. Cl.
CPC .......... *G06F 3/017* (2013.01); *G06F 3/04883* (2013.01)

(58) Field of Classification Search
CPC .... G06F 3/0488; G06F 3/017; G06F 3/04842; G06F 3/0482; G06F 9/5027;
(Continued)

(56) References Cited

U.S. PATENT DOCUMENTS

| 5,317,687 A | * | 5/1994 | Torres | G06F 3/0481 715/823 |
| 5,615,401 A | * | 3/1997 | Harscoet | G06F 3/038 709/231 |

(Continued)

FOREIGN PATENT DOCUMENTS

| EP | 2187300 A1 | 5/2010 |
| WO | WO 2007/089766 A2 | 8/2007 |

OTHER PUBLICATIONS

"How to Close or Terminate Apps Completely in Multitasking iPhone", Published Dec. 7, 2010, 4 pages, Available at: http://www.mydigitallife.info/how-to-close-or-terminate-apps-completely-in-multitasking-iphone/.

(Continued)

*Primary Examiner* — Weilun Lo
*Assistant Examiner* — Carl Lobo

(57) ABSTRACT

Described herein are embodiments that relate to implementation of multi-stage gestures, using multi-stage gestures to control applications, and allowing, under certain conditions, invocation of an open operation (which would normally only open an application or bring an application to the fore) to cause a target application to terminate before being newly opened. A multi-stage gesture may be used to invoke different functions at respective gesture stages of a same input stroke. The functions may be different forms of application "closing", such as backgrounding or suspending an application, terminating an application, and restarting an application. The restarting (including termination) of an application when the application is opened may be termed a "smart-restart", which may involve interpreting from specific user activity that a user intends to restart an application.

17 Claims, 10 Drawing Sheets

(58) Field of Classification Search
CPC ...... G06F 9/5083; G06F 21/6218; G06F 8/34;
G06F 1/1624; G06F 3/04817; G06F
3/0484; G06F 3/0481; G06F 9/4443;
G06T 19/003; G06T 13/80; G06Q
10/0633
See application file for complete search history.

(56) References Cited

U.S. PATENT DOCUMENTS

| | | | | |
|---|---|---|---|---|
| 6,064,812 | A * | 5/2000 | Parthasarathy | G05B 19/0426 717/105 |
| 6,064,816 | A * | 5/2000 | Parthasarathy | G05B 19/0426 703/21 |
| 6,459,442 | B1 * | 10/2002 | Edwards | G06F 3/04883 715/700 |
| 6,564,198 | B1 * | 5/2003 | Narayan | G06K 9/00369 706/60 |
| 7,308,591 | B2 * | 12/2007 | Dubinsky | G06F 1/3287 713/321 |
| 7,668,924 | B1 * | 2/2010 | Young | H04L 67/1097 709/212 |
| 7,720,672 | B1 * | 5/2010 | Buswell | G06F 3/1454 703/27 |
| 7,752,555 | B2 * | 7/2010 | Sutanto et al. | 715/760 |
| 7,834,861 | B2 * | 11/2010 | Lee | G06F 3/0482 345/173 |
| 7,870,496 | B1 * | 1/2011 | Sherwani | H04L 67/38 715/718 |
| 8,161,415 | B2 * | 4/2012 | Borgaonkar | G06F 3/04883 715/816 |
| 8,261,213 | B2 * | 9/2012 | Hinckley et al. | 715/863 |
| 8,373,673 | B2 * | 2/2013 | Shiplacoff | G06F 3/0416 345/156 |
| 8,390,577 | B2 * | 3/2013 | Lemort | G06F 3/04883 345/173 |
| 8,418,084 | B1 * | 4/2013 | Tischer | G06F 3/033 715/831 |
| 8,473,949 | B2 * | 6/2013 | Horvitz | G06F 9/461 718/100 |
| 8,806,369 | B2 * | 8/2014 | Khoe | G06F 3/0481 715/764 |
| 8,810,509 | B2 * | 8/2014 | Benko | G06F 3/04883 345/156 |
| 9,052,925 | B2 * | 6/2015 | Chaudhri | G06F 3/04883 |
| 9,335,913 | B2 * | 5/2016 | Stephenson | G06F 3/0482 |
| 2001/0029521 | A1 * | 10/2001 | Matsuda | G06F 17/30893 709/201 |
| 2002/0073207 | A1 * | 6/2002 | Widger | H04M 3/436 709/227 |
| 2002/0191028 | A1 * | 12/2002 | Senechalle | G09G 5/14 715/800 |
| 2004/0193699 | A1 * | 9/2004 | Heymann | G06F 17/30873 709/218 |
| 2005/0149879 | A1 * | 7/2005 | Jobs | G06F 3/0481 715/796 |
| 2005/0172162 | A1 * | 8/2005 | Takahashi | G06F 11/0709 714/4.4 |
| 2005/0246726 | A1 * | 11/2005 | Labrou | G06F 9/465 719/328 |
| 2005/0278280 | A1 * | 12/2005 | Semerdzhiev | G06F 17/30067 |
| 2006/0026521 | A1 * | 2/2006 | Hotelling | G06F 3/0418 715/702 |
| 2006/0107229 | A1 * | 5/2006 | Matthews | G06F 3/0481 715/782 |
| 2007/0033590 | A1 * | 2/2007 | Masuouka | G06F 9/5038 718/100 |
| 2008/0165140 | A1 * | 7/2008 | Christie | G06F 3/04883 345/173 |
| 2008/0168379 | A1 * | 7/2008 | Forstall | G06F 3/04883 715/778 |
| 2008/0168384 | A1 * | 7/2008 | Platzer et al. | 715/784 |
| 2008/0244589 | A1 * | 10/2008 | Darnell | G06F 9/4843 718/102 |
| 2008/0266083 | A1 * | 10/2008 | Midholt et al. | 340/540 |
| 2009/0064155 | A1 * | 3/2009 | Giuli | B60W 50/10 718/103 |
| 2009/0125796 | A1 * | 5/2009 | Day | G06F 9/4443 715/219 |
| 2009/0278806 | A1 | 11/2009 | Duarte et al. | |
| 2010/0011106 | A1 * | 1/2010 | Ohashi | H04L 12/24 709/226 |
| 2010/0020025 | A1 * | 1/2010 | Lemort | G06F 3/04883 345/173 |
| 2010/0091677 | A1 * | 4/2010 | Griff | H04L 41/12 370/252 |
| 2010/0138834 | A1 | 6/2010 | Agarwal | |
| 2010/0164909 | A1 * | 7/2010 | Momono | G06F 1/1624 345/184 |
| 2010/0185949 | A1 * | 7/2010 | Jaeger | G06F 3/04883 715/730 |
| 2010/0205563 | A1 * | 8/2010 | Haapsaari | G06F 3/0485 715/825 |
| 2010/0245131 | A1 * | 9/2010 | Graumann | G01P 15/00 341/20 |
| 2011/0032566 | A1 * | 2/2011 | Sato | H04N 1/00222 358/1.15 |
| 2011/0074719 | A1 * | 3/2011 | Yeh | G06F 3/04883 345/173 |
| 2011/0078560 | A1 * | 3/2011 | Weeldreyer | G06F 17/214 715/255 |
| 2011/0087982 | A1 * | 4/2011 | McCann | G06F 3/0481 715/769 |
| 2011/0087989 | A1 * | 4/2011 | McCann | G06F 3/04817 715/772 |
| 2011/0115702 | A1 * | 5/2011 | Seaberg | G06F 3/017 345/156 |
| 2011/0126094 | A1 | 5/2011 | Horodezky et al. | |
| 2011/0167369 | A1 | 7/2011 | van Os | |
| 2011/0167382 | A1 | 7/2011 | van Os | |
| 2011/0179386 | A1 * | 7/2011 | Shaffer | G06F 3/04883 715/835 |
| 2011/0307778 | A1 * | 12/2011 | Tsai | G06F 9/4443 715/702 |
| 2012/0060163 | A1 * | 3/2012 | Khan | H04L 63/105 718/103 |
| 2012/0068917 | A1 * | 3/2012 | Huang | G06F 3/017 345/156 |
| 2012/0069050 | A1 * | 3/2012 | Park | G06F 3/04883 345/632 |
| 2012/0078388 | A1 * | 3/2012 | Collins | G06Q 10/06 700/19 |
| 2012/0081270 | A1 * | 4/2012 | Gimpl et al. | 345/1.3 |
| 2012/0088477 | A1 * | 4/2012 | Cassidy | G11B 27/102 455/414.1 |
| 2012/0096406 | A1 * | 4/2012 | Chae | G06F 3/04883 715/825 |
| 2012/0110496 | A1 * | 5/2012 | Lee et al. | 715/778 |
| 2012/0154295 | A1 * | 6/2012 | Hinckley | G06F 3/04883 345/173 |
| 2012/0174033 | A1 * | 7/2012 | Joo | G06F 3/0485 715/831 |
| 2012/0182226 | A1 * | 7/2012 | Tuli | G06F 3/04883 345/173 |
| 2012/0188175 | A1 * | 7/2012 | Lu | G06F 3/04883 345/173 |
| 2012/0197959 | A1 * | 8/2012 | Oliver | G06F 9/5038 709/201 |
| 2012/0216146 | A1 * | 8/2012 | Korkonen | G06F 3/0482 715/835 |
| 2012/0235938 | A1 * | 9/2012 | Laubach | G06F 3/0416 345/173 |
| 2012/0254804 | A1 * | 10/2012 | Sheha | G06Q 30/02 715/834 |
| 2012/0262386 | A1 * | 10/2012 | Kwon | G06F 3/04886 345/173 |

(56) References Cited

U.S. PATENT DOCUMENTS

| | | | | |
|---|---|---|---|---|
| 2012/0278747 | A1* | 11/2012 | Abraham | G06F 9/45537 |
| | | | | 715/771 |
| 2012/0284012 | A1* | 11/2012 | Rodriguez et al. | 704/1 |
| 2013/0124550 | A1 | 5/2013 | Oel et al. | |
| 2013/0201113 | A1* | 8/2013 | Hinckley | G06F 3/0487 |
| | | | | 345/173 |
| 2013/0263042 | A1* | 10/2013 | Buening | G06F 3/0488 |
| | | | | 715/783 |
| 2014/0267089 | A1* | 9/2014 | Smith | G06F 3/04883 |
| | | | | 345/173 |

OTHER PUBLICATIONS

Mazo, Gary, "How to Switch Applications and Multitask on the Galaxy S3", Published Jul. 17, 2012, 7 pages, Available at: http://www.androidcentral.com/how-switch-applications-and-multitask-samsung-galaxy-s3.

Michaluk, Kevin, "Using the Application Switcher and Closing Apps When Finished to Maximize your BlackBerry Efficiency", Published Aug. 17, 2009, 14 pages, Available at: http://crackberry.com/using-application-switcher-and-closing-apps-when-finished-maximize-your-blackberry-efficiency.

Bidsar, Kashish, "Use Swipe Up or Down Gesture to Close Running Applications on Iphone: Swipeaway Cydia Tweak", Published Oct. 23, 2012, 3 pages, Available at: http://www.badritek.com/2012/10/swipeaway-cydia-tweak-iphone-closes-applications-by-swipe.html.

Spradlin, Liam, "Switcher Provides an Incredible Gesture-Based App Switching Tool", Retrieved: Feb. 18, 2013, 7 pages, Available at: http://www.androidpolice.com/2012/07/09/switcher-proof-of-concept-hits-the-play-store-providing-an-incredible-gesture-based-app-switching-tool/.

Wagner, Bill, "WinRT: App Activation, Resume and Suspend", Published Apr. 11, 2012, 1 page, Available at: https://billwagner.azurewebsites.net/blog/winrt-app-activation-resume-and-suspend.

International Search Report, Application No. PCT/US2013/059561, filed Sep. 13, 2013, mailed Mar. 12, 2014.

* cited by examiner

| | ACTION | ON SCREEN? | IN TASK SWITCHER? | PROCESS RUNNING? | GESTURE STAGE |
|---|---|---|---|---|---|
| 200 | *close* | no | no | yes (or suspend) | stage1 |
| 202 | *terminate* | no | no | no | stage2 |
| 204 | *restart* | yes | yes | yes | stage3 |

FIG. 5

CLOSING, STARTING, AND RESTARTING APPLICATIONS

BACKGROUND

Recently, human actuated gestures have been increasingly used to control computing devices. Various devices may be used for inputting gestures, for example mice, touch-sensitive surfaces, motion detectors using camera signals, and pressure-sensitive input surfaces, to name a few examples. Generally, there are now many means for allowing a user to provide continuous (rapidly sampled) discrete two or three dimensional input strokes (e.g., sets of connected location points or paths interpolated therefrom).

To make use of these input means, graphical user interfaces (GUIs) have been implemented to recognize gestures and invoke specific actions for specific recognized gestures. Typically, gesture recognition might include collating input points sensed at a high sample rate, determining which input points are associated with each other, and analyzing traits or features of a set of associated input points to recognize a gesture. While any type of software or program can implement gestures, gesturing is often used in conjunction with graphical desktops, graphical user shells, window managers, and the like (referred to collectively as GUIs).

GUIs are often provided to allow a user to manage and execute applications. For example, a GUI environment may have user-activatable operations or instructions to allow direct manipulation of graphical objects representing windows, processes, or applications, to open specified applications, to pause or terminate specified applications, to toggle between applications, to manipulate graphical elements of applications such as windows, to provide standard dialogs, and so forth. In other words, in a GUI environment, a user may use gestures or other means to physically manipulate digital objects in ways related to semantic meaning attached to such objects (such as discarding and closing). Previously, such operations, if gesture controlled at all, would each have their own respective discrete gestures. For example, a simple gesture such as a downward stroke has been used to invoke a close operation to close a target application, which might be a currently focused or active application.

Such a close gesture has been used to terminate an application, which might destroy an executing instance of the application, kill the application's process, etc. Thus, the next time a user requests the terminated application a full boot sequence or launch of the application is usually needed, which may result in a significant delay between the time when the application is requested and the time when the application becomes available for user interaction. Additionally, as the instant inventors alone have recognized, there is no efficient gesture-based way for a user to specify different levels of application "closing", for instance, suspending, terminating, and restarting an application. As only the inventors have observed, because gestures are intended to represent physical manipulation of a digital object representing an application, there has been no ability to map gestures to a sufficient number of different actions to simultaneously support manipulation of the numerous possible underlying states of an application.

Discussed below are ways to implement multi-stage gestures and ways to use those gestures to issue various commands for controlling applications.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are embodiments that relate to implementation of multi-stage gestures, using multi-stage gestures to control applications, and allowing, under certain conditions, invocation of an open operation (which would normally only open an application or bring an application to the fore) to cause a target application to terminate before being newly opened. A multi-stage gesture may be used to invoke different functions at respective gesture stages of a same input stroke. The functions may be different forms of application "closing", such as backgrounding or suspending an application, terminating an application, and restarting an application. The restarting (including termination) of an application when the application is opened may be termed a "smart-restart", which may involve interpreting from specific user activity that a user intends to restart an application.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows attributes of example application management functions.

DETAILED DESCRIPTION

Embodiments discussed below relate to implementation of multi-stage gestures, using multi-stage gestures to control applications, and allowing, under certain conditions, invocation of an open operation (which would normally only open an application or bring an application to the fore) to cause a target application to terminate before being newly opened.

Figure 1:
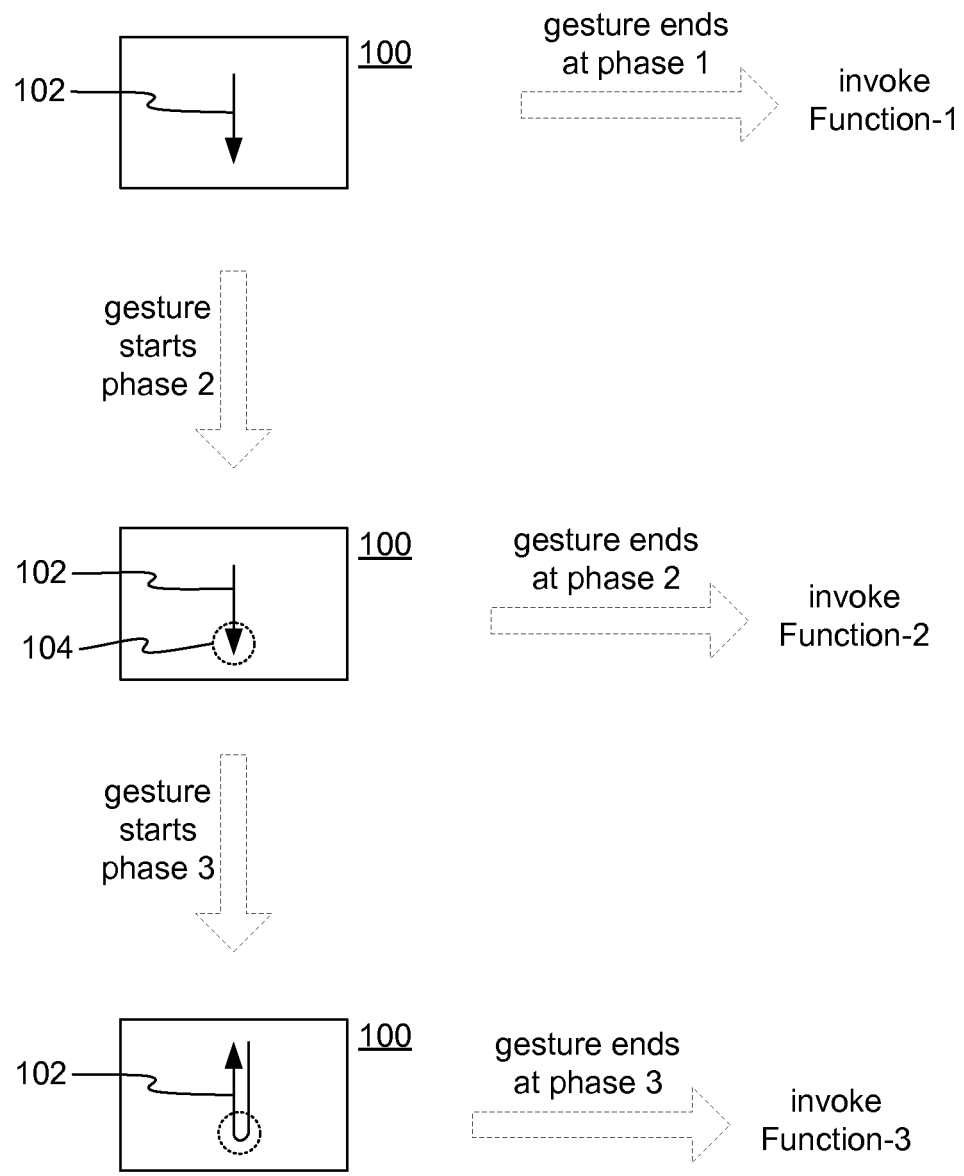
FIG. 1 shows an example of a multi-stage gesture for invoking functions or actions on a host computing device.
Figure 10:
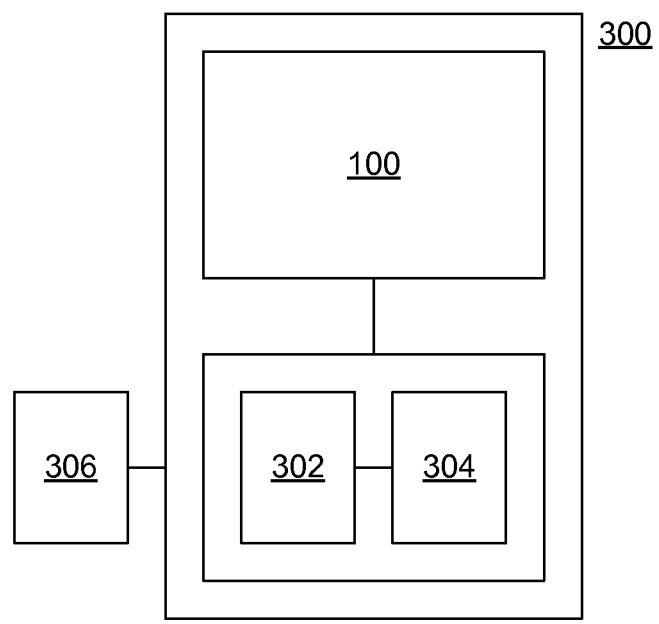
FIG. 10 shows an example of a computing device.

FIG. 1 shows an example of a multi-stage gesture for invoking functions or actions on a host computing device (see FIG. 10 for details thereof). Starting from the top of FIG. 1, a GUI environment is active on a display 100 and a user inputs a stroke 102, whose spatial relation to the GUI is indicated by the corresponding arrow representing stroke 102. The stroke 102 may be inputted by any of the types of input means mentioned in the Background; input devices for manually inputting streams of location points.

The GUI may implement or call logic to determine that the stroke 102 has completed a first phase (e.g., the stroke 102 has moved with requisite distance, direction, start and end locations, shape, etc.). At that time, if the stroke 102 ends (i.e., the user stops inputting the stroke 102), then a first function—Function-1—is invoked. However, if the stroke 102 continues without having ended then the logic may determine that the stroke 102 has completed a second phase, for example by dwelling within an area 104 for at least a predetermined time. In this case, if the user ends the stroke 102 then a second function is invoked—Function-2. Similarly, if the stroke 102 continues and it is determined that the stroke 102 has completed a third phase then a third function is invoked—Function-3. While tri-phase gestures are described herein, it will be appreciated that two-phase gestures are separately useful and all discussion of three phases is considered to be equally applicable to two-phase gestures. Any three-phase gesture described herein may inherently be any of several two-phase gestures. In addition, any technique described in relation to any stage or phase is applicable to any arbitrary gesture of two or more progressive phases or stages. That is to say, aspects of embodiments described herein can be used to build arbitrary progressive gestures of two or more stages using arbitrary gesture features for stage delineation.

Depending on implementation, only the function of the last completed phase is invoked, or each function of each completed phase may be invoked, or a combination may be used. It is also possible for functions to be partly executed when a phase is partly completed. It is also possible for functions to be invoked in anticipation of a phase and then rolled back or reversed when the phase does not occur. The functions may be any arbitrary actions invocable by the GUI. In embodiments discussed further below, the functions may be for closing, terminating, and restarting an application. Note that as used herein, "closing" will usually refer to a "soft" close of an application, as discussed below with reference to FIG. 4.

Figure 2:
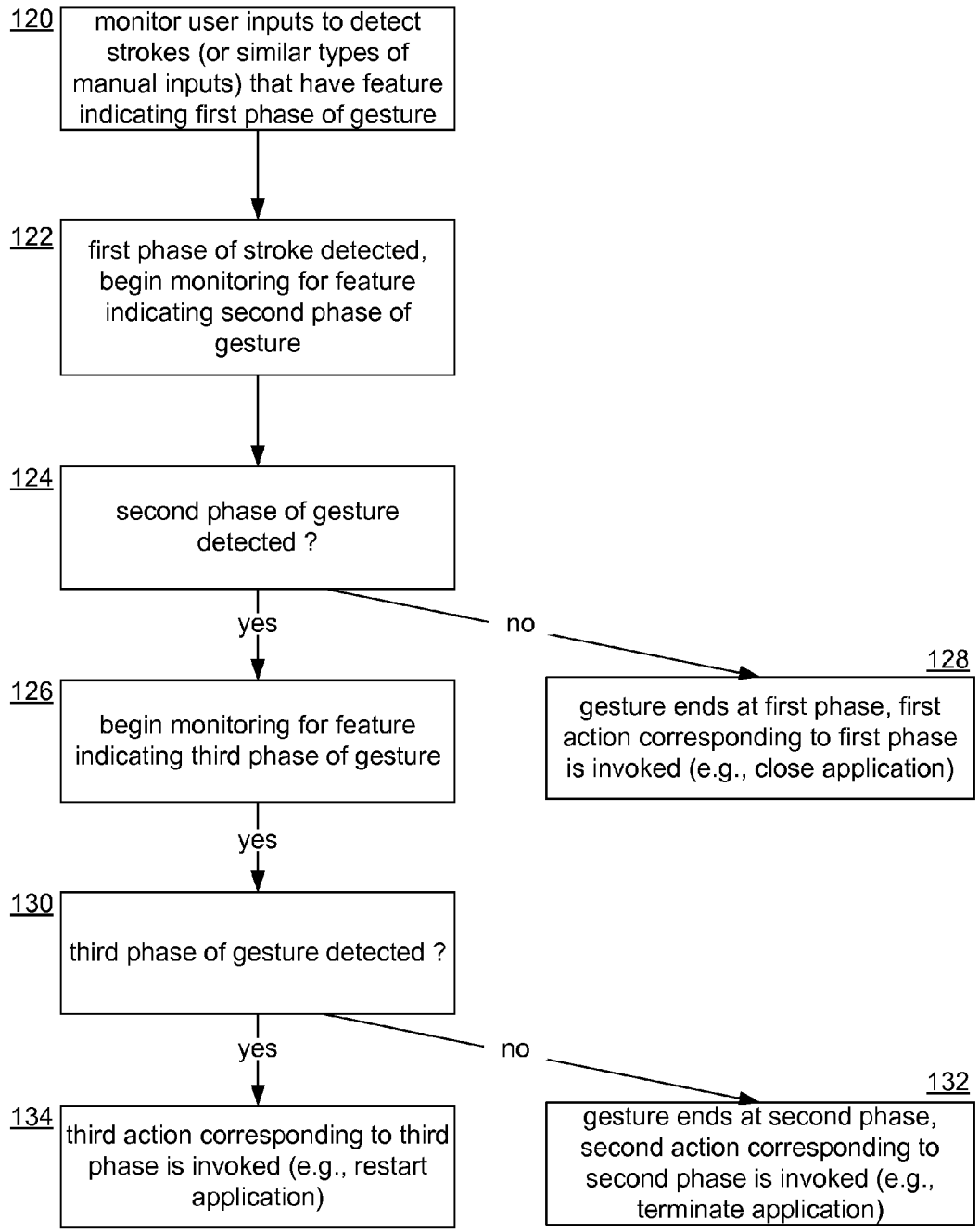
FIG. 2 shows a process for implementing a tri-phase gesture.

FIG. 2 shows a process for implementing a tri-phase gesture. The process uses features of strokes (patterns) to recognize when various gesture phases have been completed (i.e., a gesture phase or sub-gesture is recognized). As noted above, a feature might be a requisite distance, a specific direction, a relation with a predefined location or region, an inflection, a shape or type of motion, a speed, or any other property or combination of properties of stroke-type input. In short, certain predefined features are used to recognize gesture phases or sub-gestures.

At step 120 a GUI component monitors user inputs to detect strokes that have a first feature, thereby recognizing that a first phase of the gesture has been completed. This enables step 122, which begins monitoring for a feature indicating completion of a second phase of the gesture. At step 124, if the second phase of the gesture is not detected then at step 128 the gesture ends and, due to the prior completion of the first phase, the first action or function corresponding to the first phase is invoked. However, if the second phase of the gesture is detected, for example by determining that the stroke has yet another specific feature, then step 126 begins monitoring for a feature indicating a third phase of the gesture. Assuming that the same stroke continues, if the stroke ends before a feature indicating the third phase is detected, then at step 132 the second phase of the gesture is deemed to have been inputted and a second action that corresponds to the second phase is invoked. However, if the feature for the third phase is detected then at step 134 the third phase is recognized and a corresponding third action is invoked. As will become apparent below, the timing for invoking an action associated with a gesture stage can vary. In some embodiments or stages an action may be triggered by an implicit gesture feature (e.g., omission of a feature by the user), whereas in others an action may be triggered explicitly. For example a completion might be signaled by ending a stroke before an output occurs.

As can be seen from the discussion of FIG. 2, a gesture may be implemented that has three successive phases or stages. Each phase may function as a different independent user instruction or selection. Although the feature for the first phase may occur, the first phase is overridden by the second phase if the feature of the second phase is detected. Similarly, the second phase may be overridden or ignored if a feature indicating the third phase is detected. Which phase is triggered may depend on when the input stroke ends. If the input stroke ends after the first feature but before the second feature, then the first phase is the only function-activating gesture. If the input stroke ends after the second feature but before the third feature, then the second phase is the only function-activating gesture. If the input stroke ends after the third feature, then the third phase is the only function-activating gesture.

In another embodiment, even if a phase is overridden or superseded by recognition of a later phase, the function for that overridden phase, or even another function, may be invoked. For example, if the first feature is detected and then the second feature is detected, then both the first and second actions might be invoked. It is also possible to begin performing some action in anticipation of a next possible phase when a prior phase is recognized. For example, when the first phase is recognized a task may be executed to prepare for the possibility that the second phase will be recognized and that the second function will be invoked.

Figure 3:
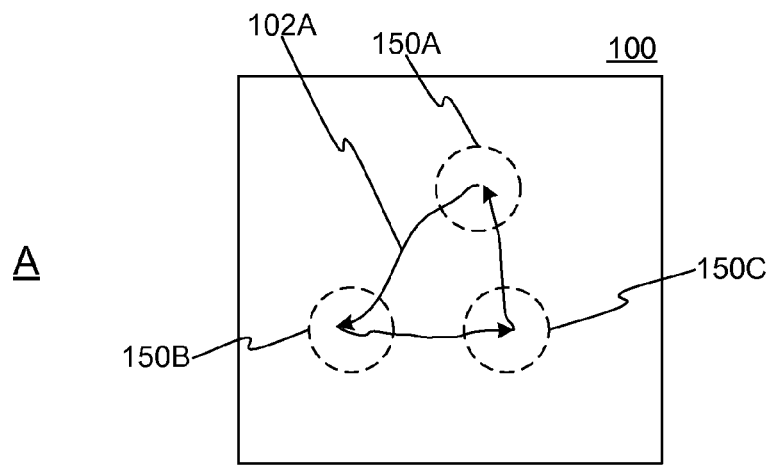
FIG. 3 shows examples of types of features or patterns that can be used to differentiate gesture phases.
Figure 3:
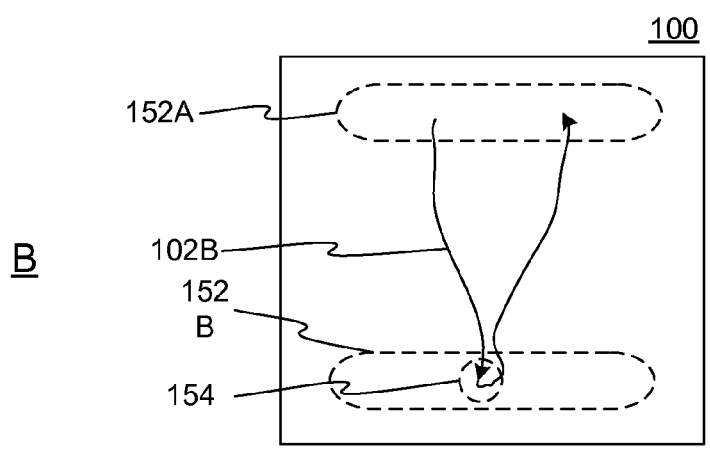
Figure 3:
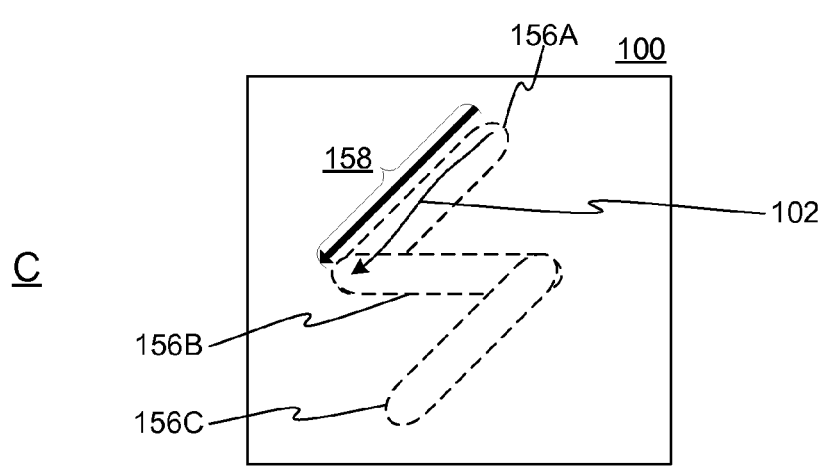

FIG. 3 shows examples of types of features or patterns that can be used to differentiate gesture phases. Example A has three regions 150A, 150B, 150C, which might be fixed in location relative to the display 100 or may be located dynamically. Starting at the first region 150A and moving into the second region 150B serves as the first feature, moving from the second region 150B to the third region 150C serves as the second feature, and moving from the third region 150C to the first region 150A serves as the third feature. Example B has two regions 152A, 152B. Starting in region 152A and moving into region 152B is a first feature, dwelling or pausing the stroke within region 152B (or a region defined by the stroke, such as region 154) is the second feature, and moving to the first region 152A is the third feature. In example C there are predefined directions 156A, 156B, 156C with predefined distances such as distance 158. The features are respective lengths of movement in respective directions (e.g., tracing a "Z" shape). In practice, distances and directions will have tolerances to allow for minor variation and imprecise input movement. It will be appreciated that these are illustrative and non-limiting examples; any combination of feature types and feature properties may be used.

Figure 4:
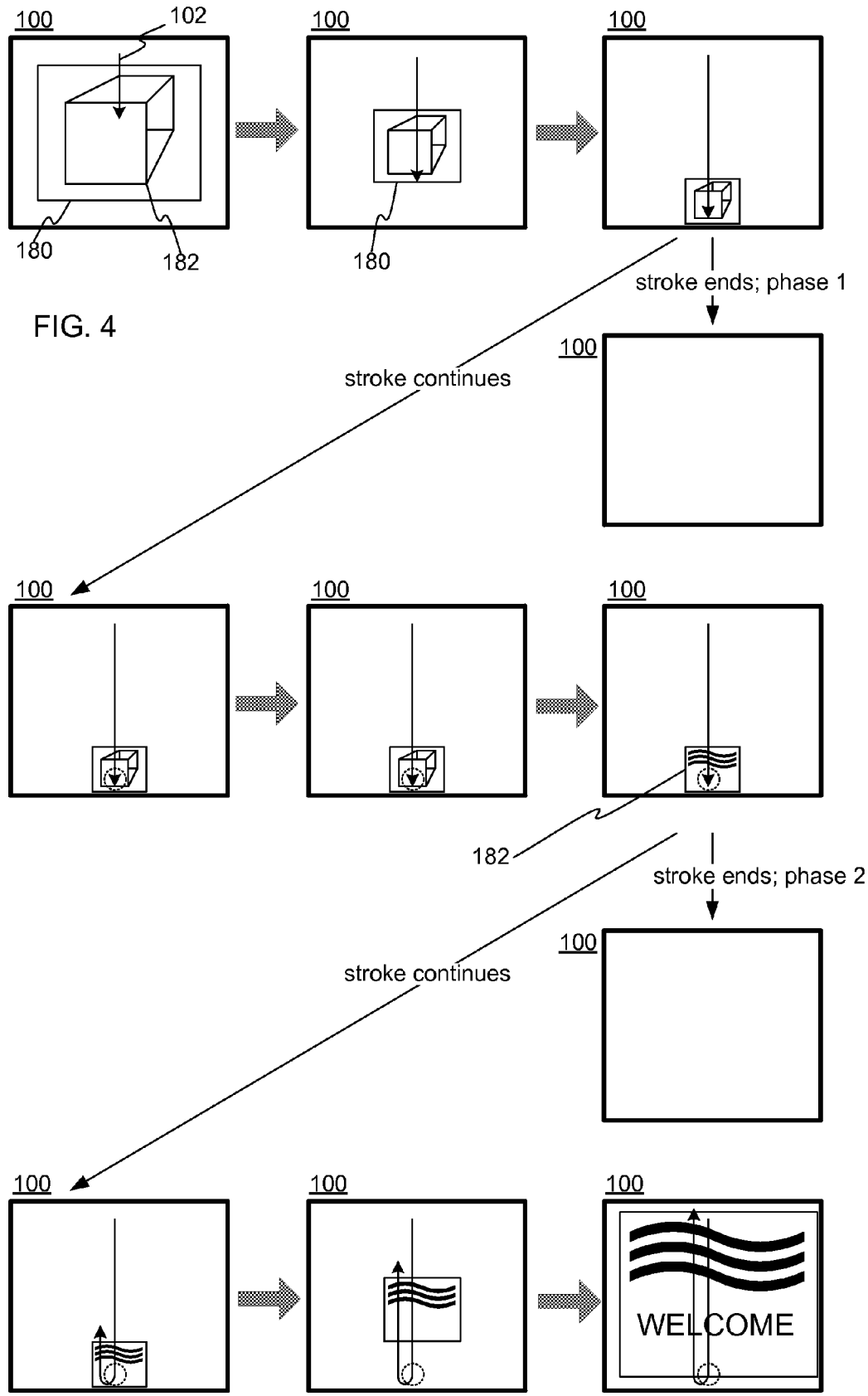
FIG. 4 shows a detailed example of how user interface (UI) feedback can be displayed to help a user appreciate a graphical user interface's recognition of various gesture stages and the corresponding invocation of functions.

FIG. 4 shows a detailed example of how user interface (UI) feedback can be displayed to help a user appreciate the GUI's recognition of various gesture stages and the corresponding invocation of functions. The example in FIG. 4 will be described as triggering functions for various types of application "close" functions.

Initially, on display 100 an application window 180 is displayed for a computer-assisted drafting (CAD) application. The window 180 includes a shape 182 being edited by a user. The stroke features for the multi-phase gesture will be those discussed in example B of FIG. 3. The use of visual feedback such as animations may involve multiple features for each gesture phase. Initially, at the upper left corner of FIG. 4, the stroke 102 begins. The stroke starting and moving out of region 152A (not shown in FIG. 4) triggers a visual effect of shrinking the application window 180. The continuation of the stroke 102 drags the shrunken application window 180 downward. If the stroke 102 moves into region 152B then the first feature is detected and at least the first phase and possibly a later phase will occur, depending on what happens next. If the stroke ends before the second phase's feature is detected, then a soft close occurs; the application window 180 is undisplayed or backgrounded and possibly execution of the CAD application is suspended.

Proceeding from left to right in the middle of FIG. 4, if the stroke 102 continues after phase one, then the feature of phase two is monitored for. If that feature is detected, for example dwelling for a predefined time such as three seconds, then another visual effect is performed: the miniaturized application window 180 is replaced with an icon 182 (or a minimized splash screen) symbolically representing the CAD application. Note that a splash screen may or may not be created by the application itself. For instance, when an application is not running a representation of the application may be created on the application's behalf. In addition, application representations may be a live window of the application (perhaps at the scale of tiles and icons), image data captured from a window of the application, etc. Referring again to FIG. 4, if the stroke ends then a second function is invoked. In this example, that involves a "hard" close of the application, meaning execution of the application terminates and executing code or a process of the application may be removed from memory and the icon 182 is undisplayed.

If the stroke continues, for example upward, then the continuation of the stroke before recognition of the third phase may cause another visual effect, for example enlarging the icon 182. Completion of the third phase, such as by ending the stroke in the region 152A, may result in yet another effect, such as showing a splash screen or other representation of the application. In addition, not only is the application closed but the application is started. Note that because the function of the second phase includes a function of the third phase (termination), the second function can be performed when the second phase completes; if the third phase completes then the application is simply started.

FIG. 5 shows attributes of example application management functions. The close operation 200 may be a "soft" close, meaning that the targeted application is partially or wholly removed from the display. In addition, the target application may be removed from user interface elements that track and possibly manipulate active applications. For example, if there is a task switcher in the form of a stack of application icons, then a target application's icon might be removed from the stack when the close operation 200 is invoked. However, the close operation 200 may allow the target application's process to remain in memory, either running in the background or suspended.

The terminate operation 202 may also remove the target application from the screen and remove representation of the target application from one or more user interface tools for selecting among active applications. In addition, the target application is killed and is no longer executing on the host computing device.

The restart operation 204 may result in the target application being displayed on the display, available in a task switcher, and running. The restart operation may also involve terminating a prior execution of the target application. In one embodiment, the target application is terminated by an invocation of the terminate operation 202 at the second phase of the gesture, and so the restart operation 204 may only start the target application. In another embodiment, the restart operation 204 both terminates the application and starts the application.

Figure 6:
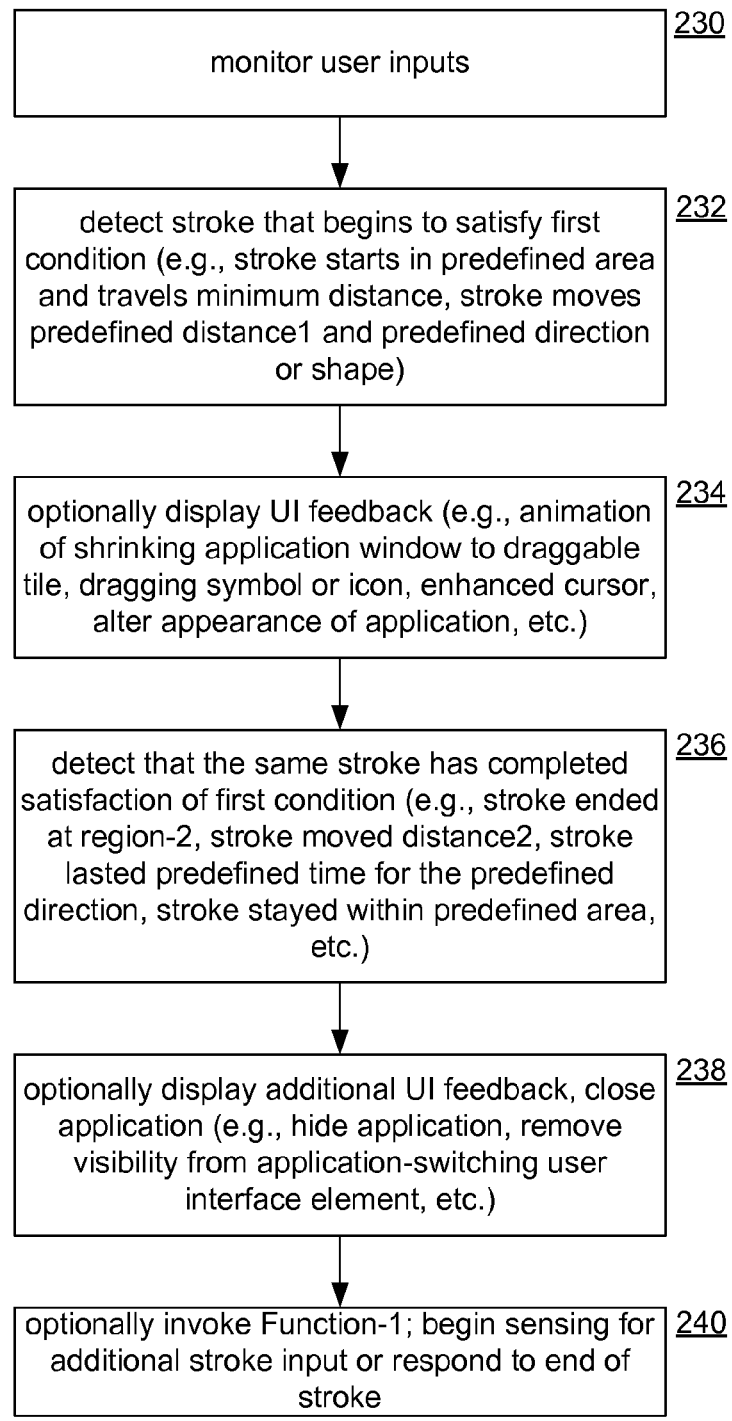
FIG. 6 shows a detailed process for detecting a first stage of a multi-stage gesture.

FIG. 6 shows a detailed process for detecting a first stage of a multi-stage gesture. Initially, a GUI environment such as a user shell monitors user input at step 230. At step 232, when a stroke is detected that begins to satisfy a first condition then UI feedback may be optionally displayed at step 234. At step 236 completion of the first condition by the same stroke is detected, additional UI feedback may be displayed at step 238, and at step 240 the function corresponding to the first phase of the gesture may be invoked. In addition, the monitoring begins to sense for additional input for the next phases of the gesture (if the stroke has not ended). Optionally, invocation of the first phase's function may be conditioned upon whether the second phase is completed.

Figure 7:
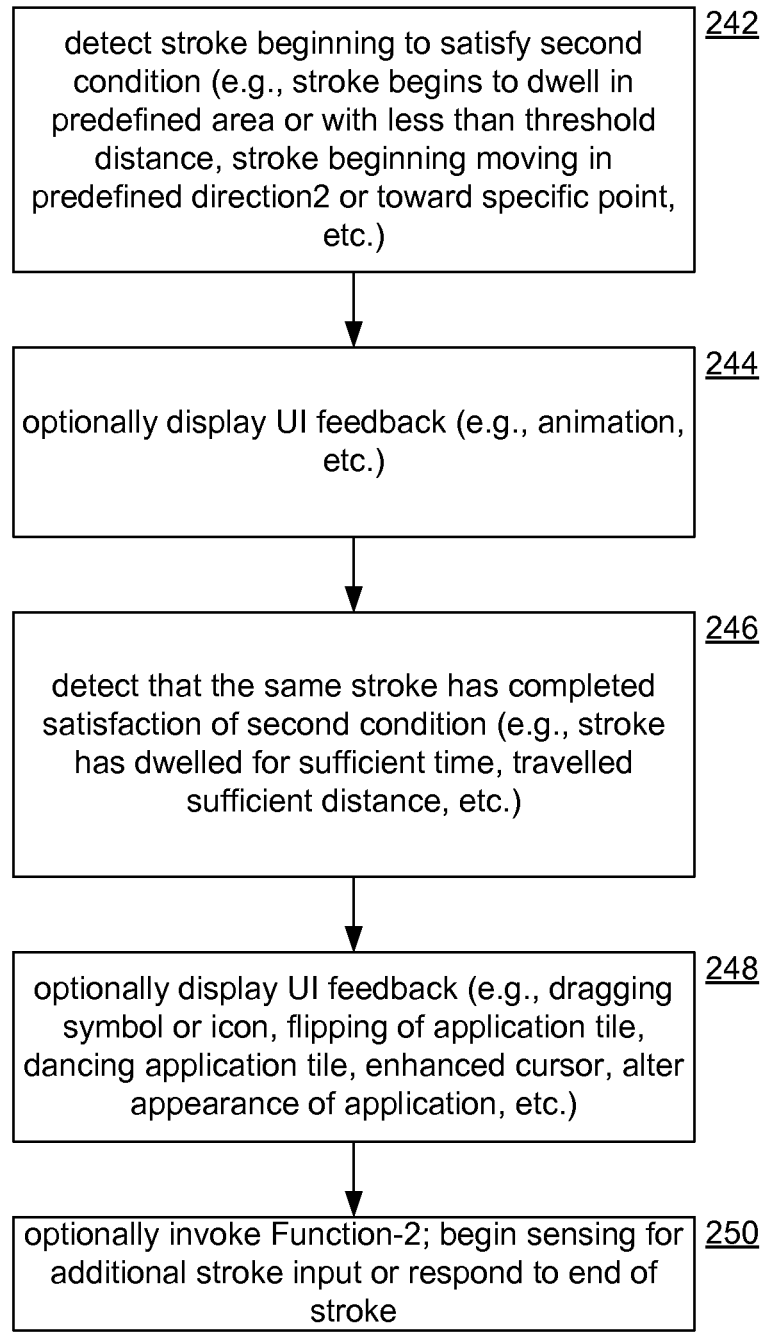
FIG. 7 shows a detailed process for detecting a second stage of a multi-stage gesture.

FIG. 7 shows a detailed process for detecting a second stage of a multi-stage gesture. At step 242 the monitoring detects the beginning of satisfaction of a second condition, and optionally in response the UI may display related feedback at step 244. At step 246 when it is detected that the second condition has been completed, then again optional UI feedback may be displayed at step 248. In addition, at step 250, the second function may be invoked, and if the stroke continues then the monitoring may continue.

Figure 8:
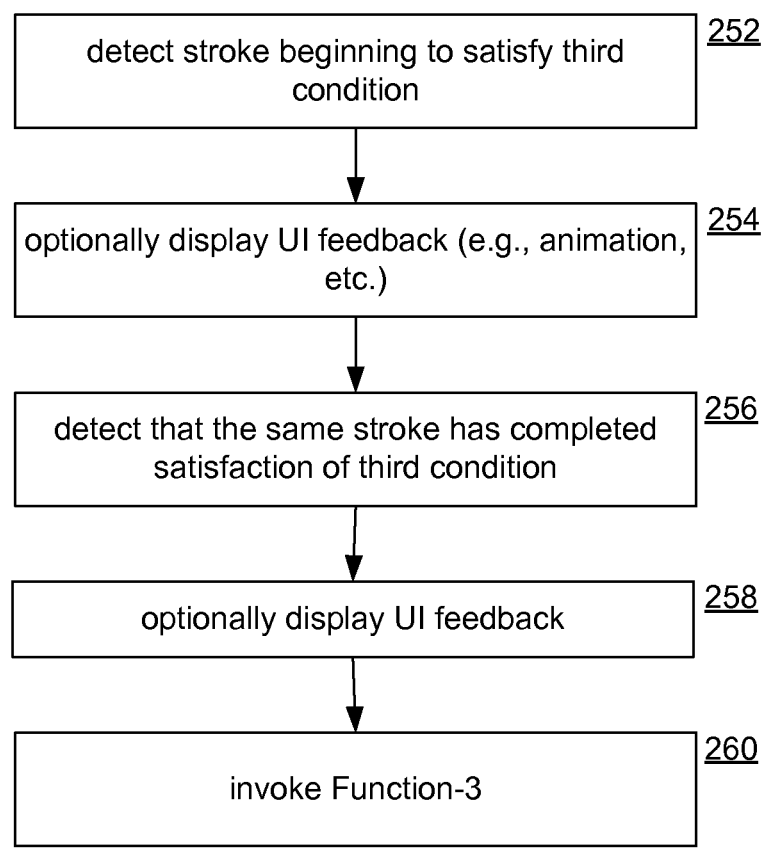
FIG. 8 shows a detailed process for detecting a third stage of a multi-stage gesture.

FIG. 8 shows a detailed process for detecting a third stage of a multi-stage gesture. At step 252 it is determined that a third condition is potentially being satisfied by the stroke and UI feedback may be displayed at step 254. At step 256 it is detected that that the stroke has fully satisfied the third condition. Consequently, step 258 may provide visual feedback on the display, and a third function is invoked at step 260.

It may be noted that at various steps the stroke may negate or fail to satisfy one of the conditions. For example, the first condition begins to be satisfied and some display activity results, and then the first condition is not satisfied (e.g., the stroke ends prematurely). In this case, not only does the gesture end without completing the first phase (and without invocation of the first function), but UI feedback may be displayed to indicate termination or incompletion. For example, optional UI feedback may be displayed or a prior UI feedback may be displayed in reverse. If the first condition is fully satisfied and the second condition is only partially satisfied when the stroke ends, then the first function may be invoked, the second function is not invoked, and an animation or the like may be displayed. If the second condition is fully satisfied and the third condition is partly satisfied, then only the second stage is completed, the third function is not invoked, and again feedback may be shown.

As noted above, the functions may be cumulative in effect. That is, if the first phase of the gesture is recognized the first function is invoked, and if the second phase is recognized the second function is invoked, and if the third phase is recognized then the third function is invoked. In addition, other forms of visual feedback may be used. For example, a simple three-part animation may be played in accordance with phase completion. In another embodiment, sound feedback is provided in addition to or instead of visual feedback.

Figure 9:
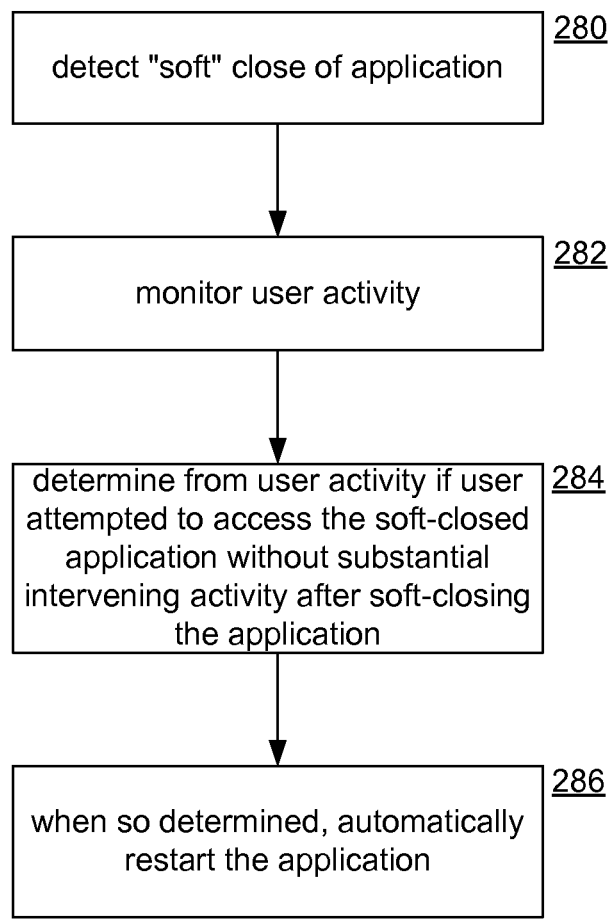
FIG. 9 shows a process for a smart-restart embodiment.

FIG. 9 shows a process for a smart-restart embodiment. The objective of the smart-restart process is to automatically interpret certain user activity as indicating an intent to actually restart an application although a soft close may have been invoked. Initially, at step 280, a soft close of an application is detected. This may use a multi-phase gesture as discussed above, or any other form of user input or command. For example, a keyboard shortcut or button press may cause the target application to hide, minimize, or suspend and undisplay. After this is detected at step 280, the process begins to monitor for additional user activity at step 282. Any of numerous known techniques for monitoring user activity may be used, such as intercepting windowing events or signals issued by a window manager. At step 284 those interactions are examined to determine if the user has attempted to access the soft-closed application without substantial intervening activity after the soft-closing. Put another way, user activity is analyzed to determine if the user has closed the application and then substantially proceeded to open the same application. At step 286, when this is determined, then the application is automatically terminated and a new execution of the application is initiated.

There may be a list of predefined user actions that are considered to indicate that a restart is not desired by the user. For example, there may be stored indicia of actions such as interaction with an application other than the target application, rearranging applications, switching-to or launching other applications, and so forth. If one of the actions in the list are detected, then the smart-restart process ends and the application remains soft-closed. In addition or instead, there may be a list of activities or actions that are to be ignored; such actions do not disrupt the step of terminating and starting the application if it is determined that the user is opening the soft-closed target application.

It is expected that the embodiments described herein will be suitable for use in environments where other gestures are active and usable for arbitrary known or new actions such as moving windows, rearranging icons, etc. This allows sequences of actions invoked by gestures, such as restarting an application, rearranging the same application, placing the application in a switch list, and so on. Gestures can be used to perform actions that transform the state of the application without forcing abandonment of other gestures, in a sense abstracting state of the application.

The use in this description of "optional" regarding various steps and embodiment should not be interpreted as implying that other steps or features are required. In addition, when implemented, the steps discussed herein may vary in order from the orderings described above.

FIG. 10 shows an example of a computing device 300. The computing device 300 may have a display 100, as well as storage 302 and a processor 304. These elements may cooperate in ways well understood in the art of computing. In addition, input devices 306 may be in communication with the computing device 300. The display 100 may be a touch-sensitive display that also functions as an input device. The computing device 300 may have any form factor or be used in any type of encompassing device. For example, touch-sensitive control panels are often used to control appliances, robots, and other machines. Of course the computing device 300 may be in the form of a handheld device such as a smartphone, a tablet computer, a gaming device, a server, or others.

Embodiments and features discussed above can be realized in the form of information stored in volatile or non-volatile computer or device readable media (which does not include signals or energy per se). This is deemed to include at least media such as optical storage (e.g., compact-disk read-only memory (CD-ROM)), magnetic media, flash read-only memory (ROM), or any means of storing digital information in a physical device or media. The stored information can be in the form of machine executable instructions (e.g., compiled executable binary code), source code, bytecode, or any other information that can be used to enable or configure computing devices to perform the various embodiments discussed above. This is also deemed to include at least volatile memory (but not signals per se) such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device discussed above.

The invention claimed is:

1. A method of implementing a multi-stage gesture on a computing device comprising a processor, a display, and an input device, the method comprising:

receiving strokes, each stroke comprising a discrete contiguous two-dimensional path inputted by a user, each stroke controlling movement of a graphic representation of an application selected thereby, each application either executing or in a state of suspended execution, the computing device providing a first task management operation and a second task management operation, the task management operations available to be performed for applications configured to execute on the computing device, wherein the first task management operation comprises suspending or hiding an application on the computing device and the second task management operation comprises terminating an application on the computing device;

automatically identifying first-stage gestures by determining that corresponding first of the strokes have each individually satisfied a first condition, wherein each of the first of the strokes have ceased being inputted by the user after having satisfied the first condition and before being able to satisfy a second condition;

each time a first-stage gesture is identified, responding by automatically triggering the first task management operation on the correspondingly selected open application;

automatically identifying second-stage gestures by determining that second of the strokes have each individually satisfied the first condition and then satisfied the second condition, each of the second of the strokes having ceased to be inputted by the user after satisfying the first and second conditions; and each time a second-stage gesture is identified, responding by automatically triggering the second task management operation on the correspondingly selected open application.

2. A method according to claim 1, wherein the computing provides a third task management operation, the method further comprising:

automatically identifying third-stage gestures by determining that corresponding third of the strokes have each individually satisfied the first condition then the second condition then the third condition, each of the third of the strokes having ceased to be inputted by the user in correspondence with satisfying the third condition.

3. A method according to claim 2, wherein each time a third-stage gesture is identified, responding by automatically triggering a third task management operation comprising restarting the correspondingly selected application on the computing device.

4. A method according to claim 3, wherein the first task management operation further comprises maintaining the correspondingly selected application in memory and causing the correspondingly selected application to be at least partially removed from the display, wherein the terminating an application comprises removing the application from memory, and wherein the re-starting comprises removing the application from memory and starting a new execution of the application.

5. A method according to claim 1, wherein the first condition comprises: immediately before having moved in a direction determined to substantially match a first specified direction, having started at a first defined area or location, having moved a threshold distance, and/or having entered or ended at a second pre-defined area or location.

6. A method according to claim 2, wherein the third condition comprises: having ended at a first pre-defined location or area, having ended after moving a threshold distance, and/or having ended at a second pre-defined location or area.

7. One or more computer-readable storage medium storing information to enable a computing device comprising a display, storage, and a processor to perform a process, the process comprising:
providing a first application management procedure and a second application management procedure, each available to be performed on applications configured to execute on the computing device;
receiving strokes detected by a user input device, each stroke comprising a discrete two-dimensional user-inputted path comprising a start of being inputted, an end of being inputted, and continuous input immediately after the start up until the end, and each stroke selecting a corresponding application installed on the computing device and controlling movement, on the display, of a corresponding graphic application representation; and
for each of the strokes, according to features of the strokes, determining when to invoke the first application management procedure and when to invoke the second application management procedure, wherein when a stroke lacking a second pre-defined feature is determined to have a first pre-defined feature before the corresponding end of being inputted, then the first application management procedure is invoked on the correspondingly selected application, and, when a stroke is determined to have the first pre-defined feature and immediately thereafter have a second pre-defined feature followed by the corresponding end of being inputted, then the second application management procedure is invoked on the correspondingly selected application, wherein the first and second application management procedures respectively comprise either (1) terminating an application and restarting an application, or (2) suspending an application and terminating an application.

8. A computer-readable storage medium according to claim 7, the process further comprising providing a third application management procedure available to be invoked on the applications, and determining when to invoke the third application management procedure, wherein the third application management feature is invoked on a correspondingly selected application based on a determination that the stroke has the pre-defined first feature, the second pre-defined feature, and the third pre-defined feature.

9. A computer-readable storage medium according to claim 7, wherein when a completed stroke does not have the second pre-defined feature then the second application management procedure is not invoked for the correspondingly selected application.

10. A computer-readable storage medium according to claim 8, wherein the first application management procedure hides whichever application it is invoked on but does not terminate the application, and the second application management procedure at least terminates whichever application it is invoked on such that the application is neither running nor suspended after being terminated.

11. A computer-readable storage medium according to claim 8, wherein whether a stroke invokes the first or second application management procedure depends, respectively, on whether the stroke is determined to have (i) the first pre-defined feature, or (ii) the first and second pre-defined features.

12. A computer-readable storage medium according to claim 7, the process further comprising displaying a first visual effect responsive to detecting the first pre-defined feature and displaying a second visual effect responsive to detecting the second pre-defined feature.

13. A computer-readable storage medium according to claim 12, wherein the first visual effect comprises displaying a reduced-size representation of the application, and the second visual effect comprises displaying a second representation of the application.

14. A computing device comprising:
a display;
storage storing instructions; and
a processor, when the computing device is operating, configured by the instructions to execute a process, the process comprising:
receiving inputs of strokes, each stroke consisting of a chain of one or more segments formed by a discrete continual two-dimensional user input, each stroke selecting an application on the computing device and controlling movement, on the display, of a graphic that represents the correspondingly selected application;
recognizing gestures for the respective strokes, the gestures recognized including first gestures, and second gestures, wherein:
each first gesture is recognized based on a first determination of a corresponding stroke, which upon finishing lacks a second and third type of stroke segment, finishing being inputted by a user after a segment of the corresponding stroke has been determined to match a first type of stroke segment was inputted, each type of stroke segment defined by a respective distance, location, and/or duration,
each second gesture is recognized based on a second determination of a corresponding stroke, having a first segment matching the first type of stroke segment followed by a second segment matching the second type of stroke segment; and
responding to each recognition of the first gesture by performing a first operation on the correspondingly selected application and responding to each recognition of the second gesture by performing a second operation on the correspondingly selected application, wherein the first operation and the second operation comprise two different operations from a group consisting of: hiding an application, suspending an application, terminating application, and restarting an application.

15. A computing device according to claim 14, wherein each second gesture is recognized based further on a second determination that the corresponding stroke, upon finishing, lacks a third type of stroke segment.

16. A computing device according to claim 14, wherein the gestures recognized further includes third gestures.

17. A computing device according to claim 16, wherein each third gesture is recognized based on a third determination of a corresponding stroke having a first segment matching the first type of stroke segment followed by a second segment having the second type of stroke segment followed by a third segment having a third type of stroke segment.

\* \* \* \* \*